(12) United States Patent
Knipfer et al.

(10) Patent No.: US 7,333,870 B2
(45) Date of Patent: Feb. 19, 2008

(54) SELF-ADJUSTING INVENTORY MANAGEMENT PROCESS FOR PERSONALIZING AND RE-PERSONALIZING PARTS

(75) Inventors: Ivory Wellman Knipfer, Rochester, MN (US); John Walter Marreel, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/423,812

(22) Filed: Jun. 13, 2006

(65) Prior Publication Data
US 2007/0288112 A1    Dec. 13, 2007

(51) Int. Cl.
*G06F 19/00*    (2006.01)
(52) U.S. Cl. ........................... 700/105; 700/106
(58) Field of Classification Search ......... 700/105–107
See application file for complete search history.

(56) References Cited

U.S. PATENT DOCUMENTS

| | | | |
|---|---|---|---|
| 5,099,431 A * | 3/1992 | Natarajan | 700/105 |
| 2002/0077850 A1 | 6/2002 | McMenimen et al. | |
| 2003/0163399 A1 | 8/2003 | Harper et al. | |
| 2004/0064382 A1 | 4/2004 | Negron | |
| 2004/0093287 A1 * | 5/2004 | Gupta et al. | 705/29 |
| 2005/0262105 A1 | 11/2005 | DelGaudio et al. | |
| 2006/0190291 A1 * | 8/2006 | Erickson et al. | 705/1 |
| 2006/0200262 A1 * | 9/2006 | Dyer | 700/117 |

* cited by examiner

*Primary Examiner*—Ryan A Jarrett
(74) *Attorney, Agent, or Firm*—Duke W. Yee; Gregory M. Doudnikoff; Gerald H. Glanzman

(57) ABSTRACT

A process for managing a supply chain by automatically analyzing shifting demand for personalized parts is provided. A plurality of orders is received. The plurality orders form a demand. The demand results in a set of parts that need to be personalized. The demand is analyzed against the current parts in the existing inventory. The current parts necessary to fulfill the demand are determined. Instructions for personalizing the current parts to correspond with the demand are generated. The instructions are processed.

17 Claims, 5 Drawing Sheets

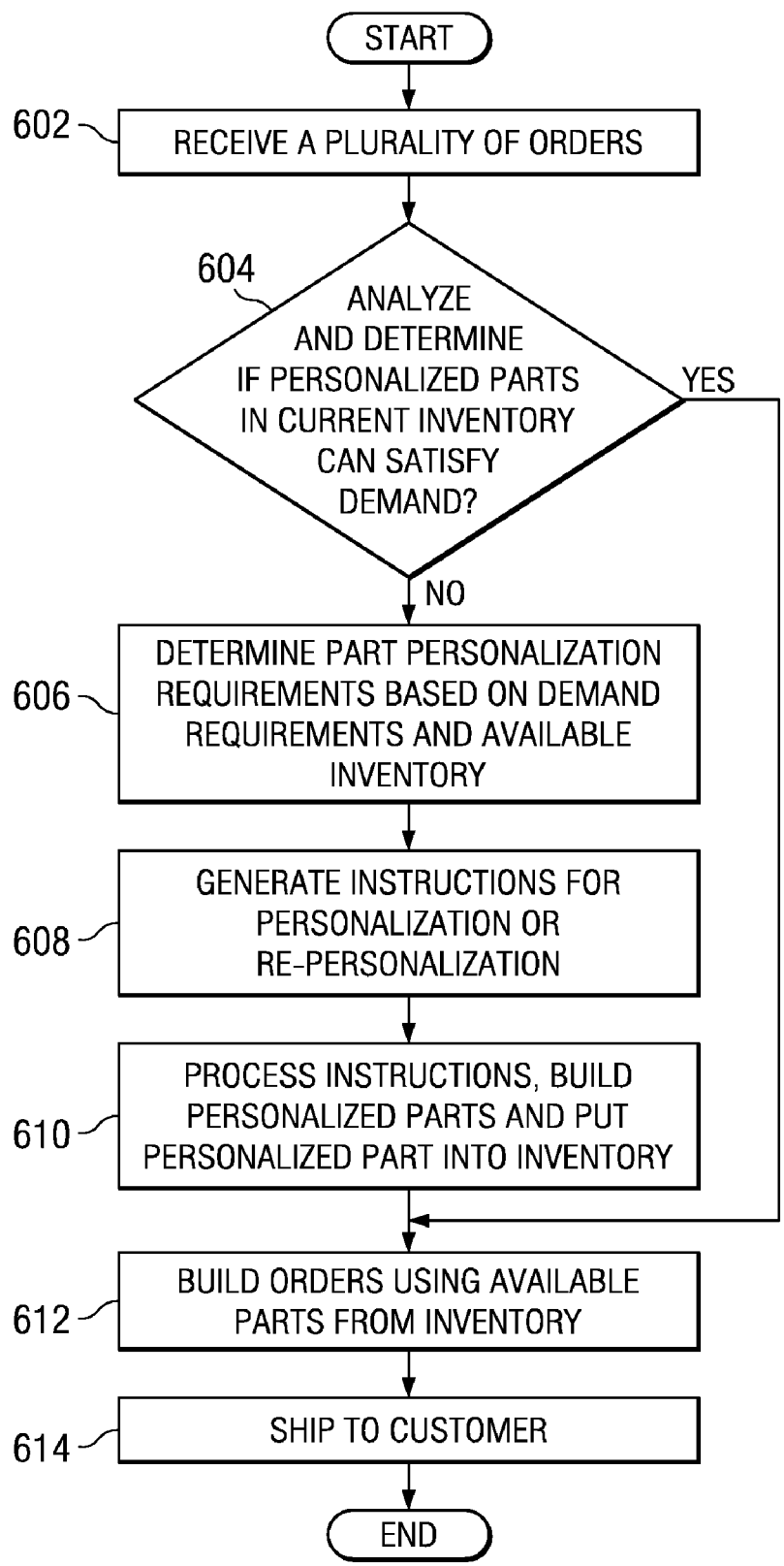

SELF-ADJUSTING INVENTORY MANAGEMENT PROCESS FOR PERSONALIZING AND RE-PERSONALIZING PARTS

BACKGROUND OF THE INVENTION

1. Field of the Invention

The present invention relates generally to a data processing system. More specifically, aspects of the present invention provide for a method, computer program product and data processing system for dynamically managing a supply chain by dynamically analyzing shifting demand for personalized parts.

2. Description of the Related Art

Products now have the ability to be customized by the firmware such that the same piece of hardware can behave differently. For example a 2.9 GHZ (gigahertz) processor may have firmware loaded so that the processor may run at slower speeds. Supply chain has seen a growth in a type of hardware personalization that reduces the number of components to be planned and procured. Hardware personalization is a process that converts a piece of hardware from a specific part number to be a different part number by personalizing the device with firmware or microcode. Personalizing, or personalization, is modifying the internal operations of a part with software to conform with a particular specification. Re-personalizing, or re-personalization, is personalizing a part that has previously been personalized in order to form a different personalized part. For example, a 2.9 GHZ processor may have firmware loaded so that it operates as a 2.65 GHZ processor. This may be done in order to buy common parts for multiple processor points without purchasing many different processor part numbers. The change may be simply to down stroke higher processor points to the slower speed in order to meet demand during a supply shortage. Another example of hardware personalization is taking a 2 GB (gigabyte) Memory DIMM (dual in-line memory module), priced specifically for a UNIX platform and converting the 2 GB Memory DIMM to a 2 GB Memory DIMM for an iSeries™ platform such that the DIMMS operate as functionally two different part numbers and are not compatible with each other. Additionally, the DIMMS can be priced separately from each other, as they are two different parts that perform differently.

The reduction in planning and procurement is due to the ability to purchase one generic part number capable of representing many personalized part numbers. The problem that arises in this type of supply chain system is that once a product has been personalized, the product requires a new part number and the product is no longer able to be used as-is for other order demands. Shifting demands, exaggerated by high order skew and shorter cycle times, make it very difficult to maintain a supply match without purchasing excess inventory.

Typically, a supply chain uses demand reports that drive the manufacturing team to personalize generic parts to specific parts. As the order demand shifts, the supply chain commonly reacts by purchasing additional generic parts for personalization. The purchasing of additional generic parts increases inventory carrying costs and also impacts cycle time. Generally, the time required to procure and pull additional generic parts is longer than the time required to re-personalize a part. Typically, a materials replenishing plan or materials requirements plan (MRP) system is used to identify the generic part demand, as well as to identify the necessary quantity of each personalized part, based on current orders. A major challenge is that MRPs generally run weekly or, at best, nightly. In contrast, demand for a particular generic or personalized part can shift throughout the course of a single business day. Additionally, MRP output does not provide instruction on what or when to re-personalize certain inventory in order to make up for shortages in other inventory. This type of logical decision can only be made at the manufacturing assembly level in real time.

There is a rising tide of hardware personalization occurring in the supply chain in order to maximize the throughput of suppliers and minimize the costs to procure parts. At the same time, the supply chain has seen decreasing cycle times, as demanded by the customers, with an order book that consistently changes with spikes in demand, changes in order configurations, and product cancellations. The changes in the order books can occur nearly continuously throughout each production day. Generally, the higher the level of configuration offered for a product, the more variability and opportunity for changes in the order demand. Under current supply chain dynamics, there is little time to react to the demand changes in the standard, traditional fashion, that is, ordering more parts. A new solution is required.

Therefore, it would be beneficial to have a method and process that automatically corrects or adjusts personalized inventory, thereby maximizing inventory use while reducing associated cost.

BRIEF SUMMARY OF THE INVENTION

Exemplary embodiments describe a computer implemented method, a computer program product and a data processing system for managing a supply chain by automatically analyzing shifting demand for personalized parts. A plurality of orders is received, wherein the plurality of orders form a demand and wherein the demand results in a set of parts that need to be personalized. The demand is analyzed against the current parts in the existing inventory. The current parts necessary to fulfill the demand are determined. Instructions for personalizing the current parts to correspond with the demand are generated. The instructions are processed.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart illustrating the operation of dynamically self-adjusting inventory based on demands for hardware personalization in accordance with an exemplary embodiment.

DETAILED DESCRIPTION OF THE INVENTION

Figure 1:
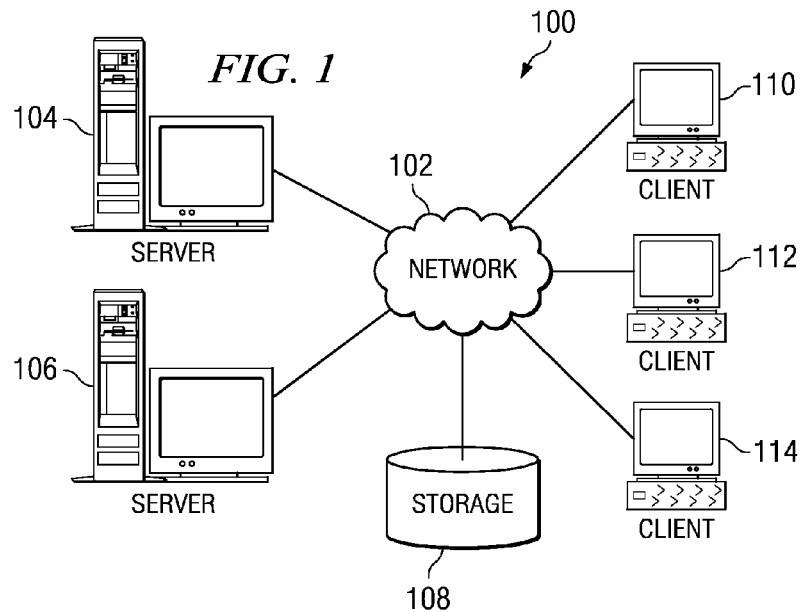
FIG. 1 is a pictorial representation of a network of data processing systems in which exemplary aspects may be implemented.
Figure 2:
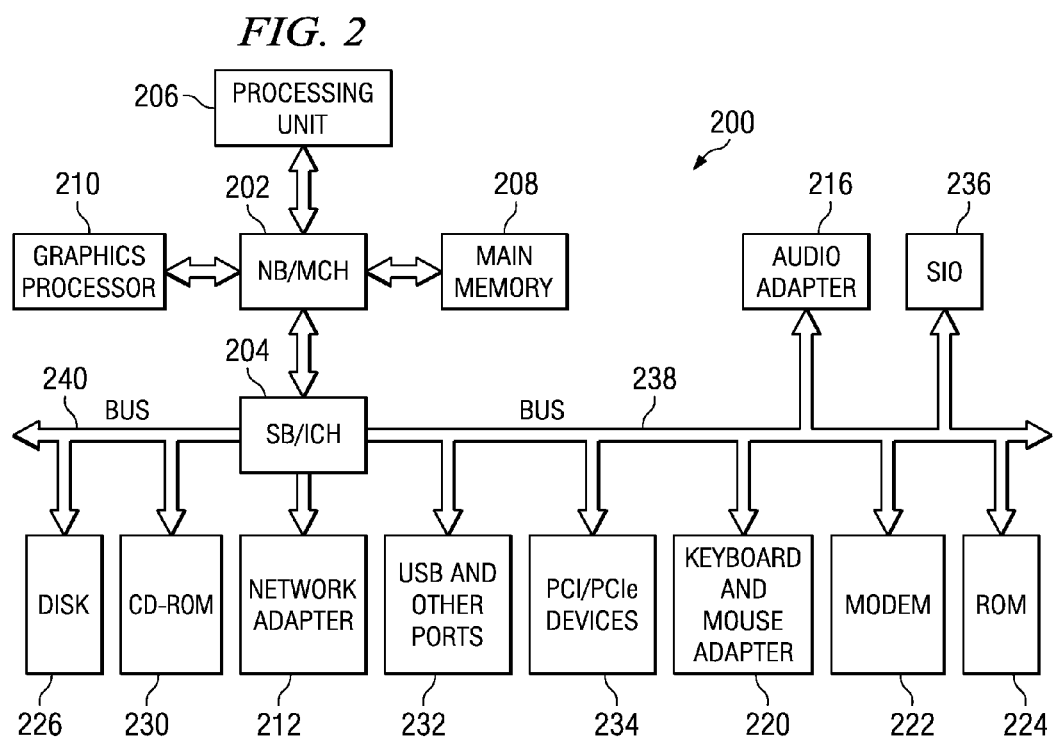
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a method and process to analyze in real-time the shifting demand for personalized parts, and the current manufacturing activity, to automatically generate personalization and re-personalization direction for manufacturing. An exemplary embodiment reduces expedited inventory purchases and inventory carrying cost. Order fulfillment cycle time is also reduced. An exemplary embodiment provides for a self-adjusting inventory that matches order dynamics. The method is driven by a set of rules that ensures that process and inventory controls are maintained. Human error and inability are eliminated from the process of maintaining supply to order demand.

An exemplary embodiment provides an automated process that yields manufacturing personalization and re-personalization direction. Within the automated process, part-to-part re-personalization limitations based on personalization process setup in the manufacturing execution system are automatically identified. Personalized parts that use the same, or substitute, generic part numbers are allowed to be re-personalized from one part to another part. Order backlog for the subset of parts that are personalized is automatically analyzed in order to determine net demand for the parts. The demand is then automatically categorized based on order priority within the manufacturing execution system, as well as being based upon started short orders versus un-started orders. Any on-hand inventory is automatically analyzed against current order demand to see if any parts in the inventory are capable of being personalized or re-personalized to meet the demand. Then personalization and re-personalization instructions are generated, manufacturing executes to those instructions, and the necessary inventory movement transactions are automatically executed. The automated process is controlled by run rules. Run rules are a set of table driven parameters that vary with the particular implementation and product being manufactured.

For example, a run rule could control the frequency to run the analysis of the demand for a particular part number. The frequency could be decided based on plant location and by time of day. Frequencies could be set to run the analysis once a day or once an hour, for example. The analysis could be triggered by load, that is, when an order backlog occurs that meets or exceeds a certain threshold size demand for a quantity of parts. Additionally, triggers could be established so that when a shortage of a part is detected, an analysis is triggered to run a certain number of hours later, or a certain number of hours after the initial search was conducted.

Other types of run rules may include alert mechanisms, such as automatic notification when work direction is incapable of being calculated, or when there are not enough generic parts or other parts to be personalized to meet the current demand. An alert may be sent when identifying specific serial numbers or part numbers that need to be re-personalized. Run rules may also define personalization and re-personalization mapping and include priority sorting. For example, part A should be made from part B first. If part B is not available, then part A should be made from C. Part A should never be made from part D. If neither part B nor part C is available, then part A should be made from generic part Z. If part Z is not available then generate a pull order for more of part Z. Priority sorting means looking for part B and C and excluding part D before looking for generic part Z. Order priority may also be taken into consideration. For example, output could be impacted based on satisfying "started short" orders first, higher dollar orders second, world trade third, and the rest last. Personalization count could also be a run rule. For example, some parts might only be able to be personalized a fixed number of times. Therefore, the number of times that the part has been personalized has to be tracked and used in the analysis. For example, a part may be set up to be excluded from the analysis because the part may only be personalized twice before it has to be scrapped. Or, the part could be the last priority for matching, in order to minimize the chance of re-personalizing of the part. Additionally, a tolerance level could be established on part number basis to ensure that the part number is not over personalized. The rule would allow a certain minimal quantity of overage for a particular part number.

Figure 3:
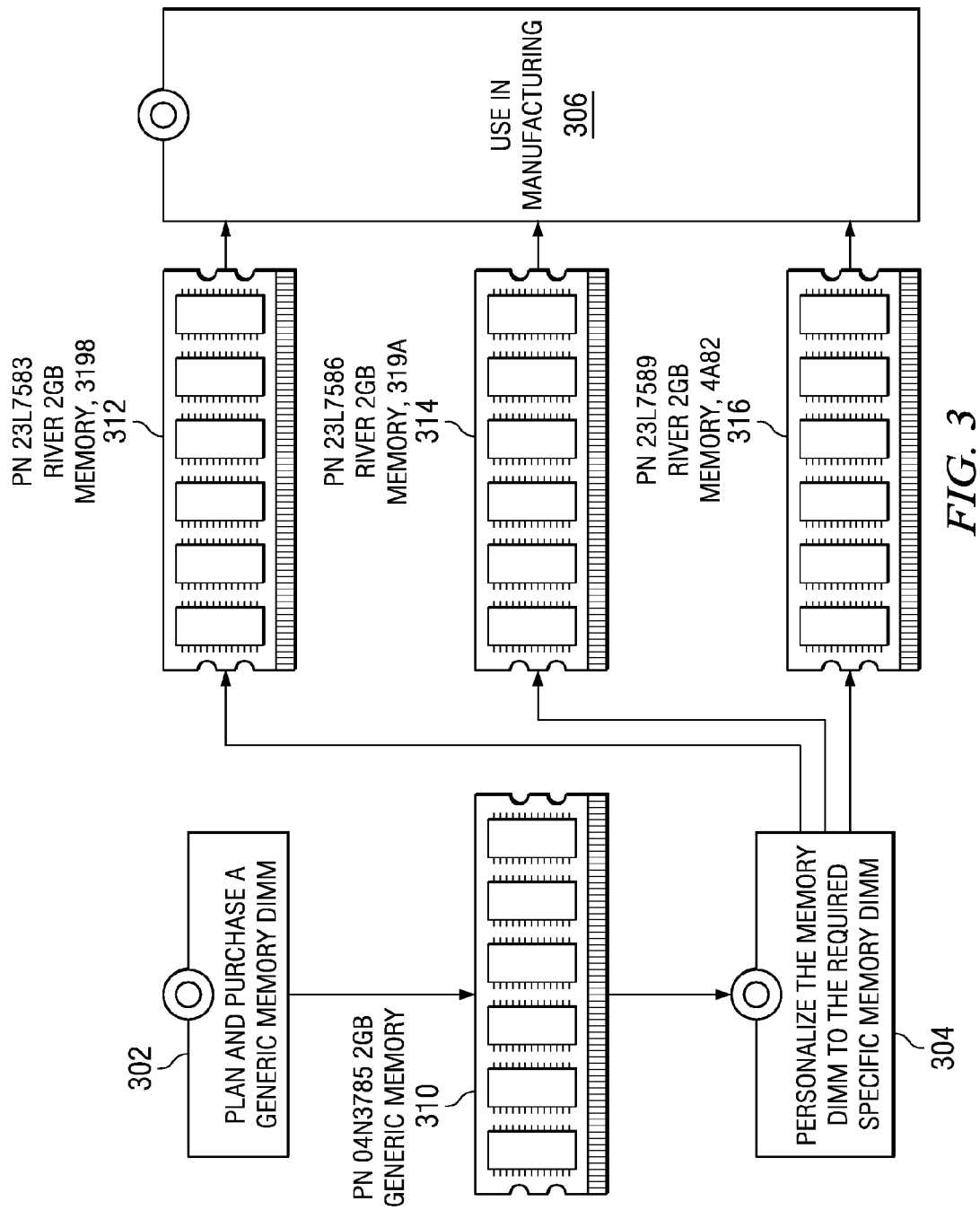
FIG. 3 is a pictorial depiction of hardware personalization of memory.

Turning back to the figures, FIG. 3 is a pictorial depiction of hardware personalization of memory. The personalization begins by planning and purchasing a generic memory DIMM, DIMM 310 (step 302). DIMM 310 is a part number (PN) 04N3785, 2 GB generic Memory DIMM. Generic DIMM 310 is then personalized to the various required specific memory DIMMs, DIMM 312, DIMM 314, and DIMM 316 (step 304). DIMM 312 is a PN 23L7583 River 2 GB memory, 3198 DIMM. DIMM 314 is a PN 23L7586 River 2 GB memory, 319A DIMM. DIMM 316 is a PN 23L7589 River 2 GB memory, 4A82 DIMM. These various specific DIMMs are used in a manufacturing process (step 306). Typical types of personalization actions are to adjust the speed/capability of a particular device in order to allow the device to have multiple uses. Conversely, firmware may be added to a device to control the valid use of the device, such as limiting the device to use in only one specific type of system.

Figure 4:
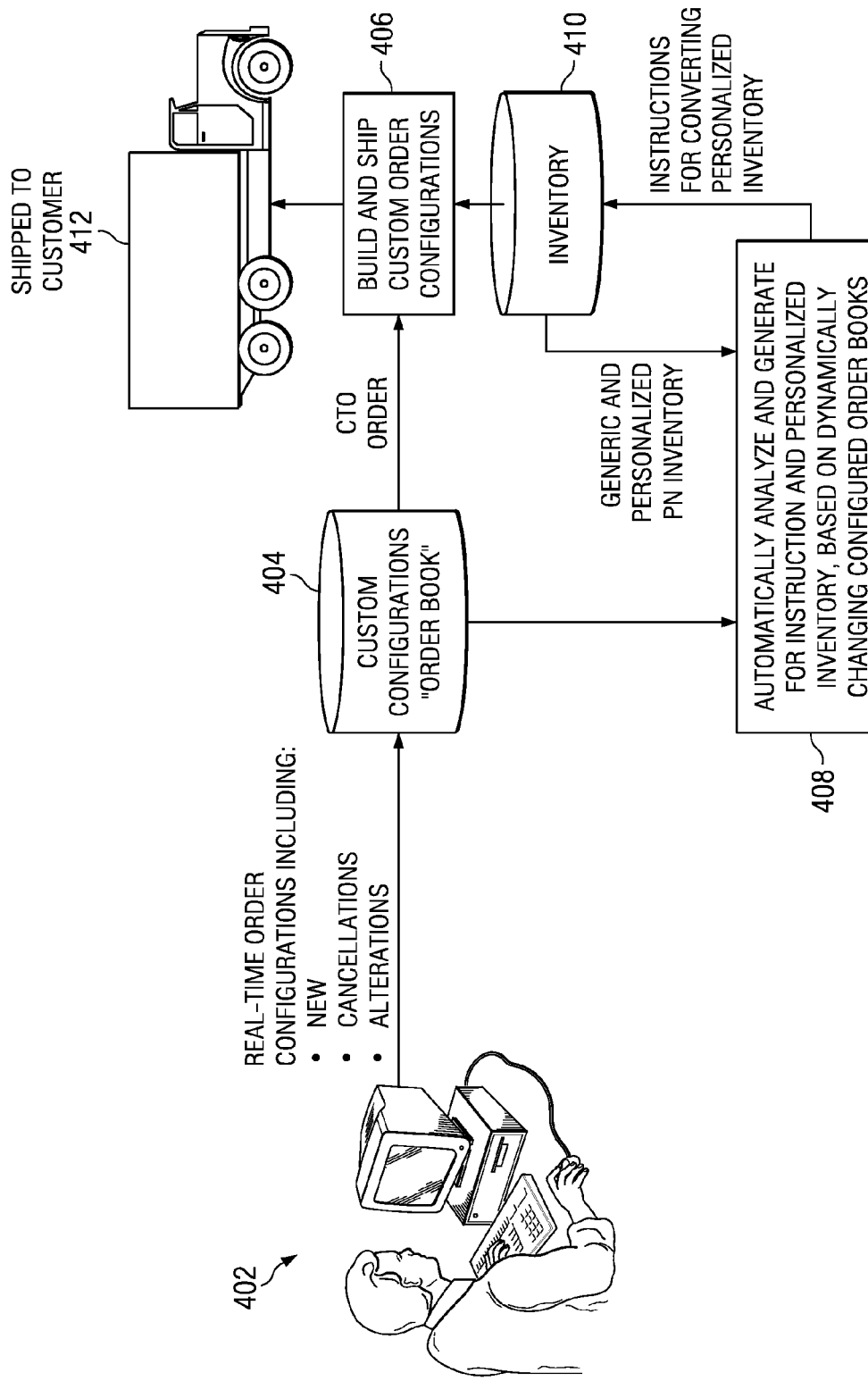
FIG. 4 is a diagram illustrating an information flow for a dynamically self-adjusting inventory management process for hardware personalization in accordance with an exemplary embodiment.

FIG. 4 is a diagram illustrating an information flow for an automated self-adjusting inventory management process for hardware personalization in accordance with an exemplary embodiment. The flow begins when user 402 inputs real-time order configurations, known as configure-to-order (CTO) orders, including new orders, cancellations of orders, and alterations to orders. The custom configurations order book 404 is a backlog of various one-of-a-kind CTO configurations. These configurations result in a set of parts for manufacturing which contain demands for various personalized parts. A set of parts comprises one or more parts. A CTO configuration is a specification for many parts assembled together wherein some parts require hardware personalizations. A demand is the required set of parts for a set of orders. Custom configurations order book 404 is under constant change as new information is received. Each time that new information is received into custom configurations order book 404, a determining component of build and ship process 406 determines if inventory 410 contains sufficient currently existing personalized parts to fulfill the demand. If build and ship process 406 determines that the demand can be fulfilled with the existing inventory, the manufacturer then builds the custom order configuration, pulling the needed current parts from inventory 410, and ships the finished goods to the customer (step 412).

If the demand cannot be fulfilled with the existing inventory, a CTO order remains in the backlog of order book 404, which contains the required personalization part numbers and quantities. Existing inventory shortages for personalized parts are analyzed by an analyzing component in step 408 to determine if parts can be re-personalized into other parts, thereby covering short parts for orders in order book 404. The analysis of personalized inventory in step 408 runs as frequently as defined in the run rules, generally in real-time. During step 408 the personalization requirements in order book 404, or demand, is compared to the on-hand inventory of inventory 410. Run rules determine the personalization and re-personalization instructions for manufacturing. The instruction are generated by a generating component in step 408. The generic and personalized part number inventory from inventory 410 is converted to the need personalized inventory in step 408 and used in build and ship process 406 to build and ship each CTO to the customer (step 412).

Figure 5:
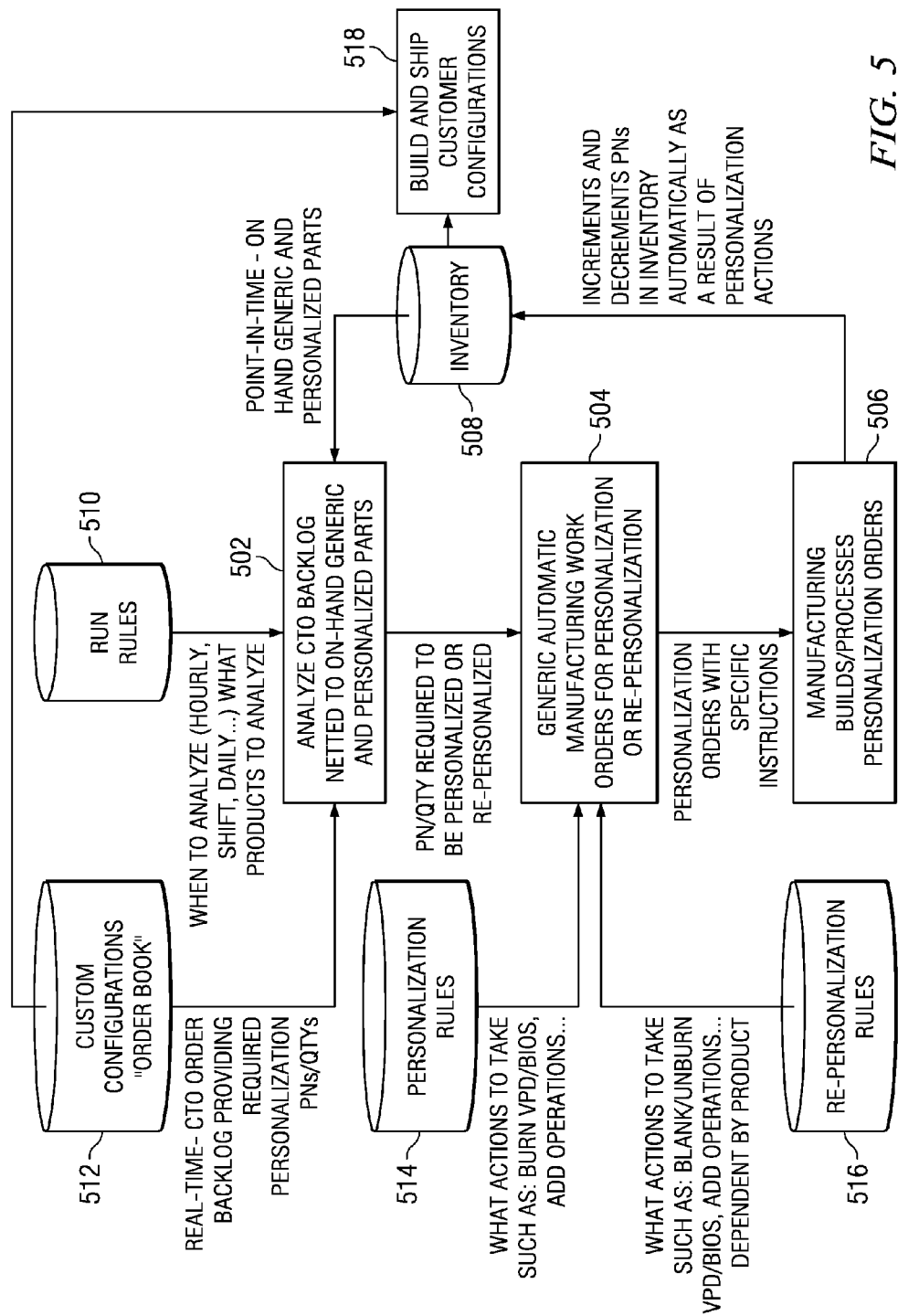
FIG. 5 is a block diagram illustrating an automated hardware personalization process that supports a dynamic configure-to-order production operation in accordance with an exemplary embodiment.

FIG. 5 is a block diagram illustrating an automated hardware personalization process that supports a configure-to-order production operation in accordance with an exemplary embodiment. FIG. 5 is more detailed look at step 408 of FIG. 4. The operation begins by analyzing the CTO backlog order, known as the demand, compared to the on-hand generic and personalized parts in inventory 508 (step 502). The operation gets the demand from custom configurations order book 512. The demand contains the required personalized part number and quantity needed to fill the order. The information regarding the on-hand generic and personalized parts is gathered from inventory 508. Run rules 510 provide the rules for when to perform step 502. Next, manufacturing work orders are automatically generated for the personalization and re-personalization of the parts from inventory 508 (step 504). The work orders are generated based on personalization rules 514 and re-personalization rules 516. The personalization orders with specification instructions regarding the personalization and re-personalization of the parts are sent to manufacturing personnel, who process the personalization orders and build, either personalizing or re-personalizing, the part (step 506). The personalized parts are then placed into inventory 508. The actual customer CTO orders that require building and shipping are sent from order book 512 to build and ship customer configurations 518. This causes the personalized parts to be pulled from inventory 508 at the appropriate times to build and ship the CTO customer orders from Order Book 512. While personalization rules 514 and re-personalization rules 516 are shown as separate databases, it is possible for both sets of rules to be part of one database, depending on the particular implementation. Furthermore, the personalization rules and re-personalization rules may also be contained within run rules 510, depending on the specific implementation.

FIG. 6 is a flowchart illustrating the operation of dynamically self-adjusting inventory based on demand for hardware personalization in accordance with an exemplary embodiment. The operation begins when a plurality of orders are received (step 602). The plurality of orders form a demand. The demand results in a set of parts that need to be personalized. The operation analyzes the demand and determines if personalized parts in the current inventory can satisfy the demand (step 604). If the operation determines that personalized parts in the current inventory can satisfy the demand (a "yes" output to step 604), the personalized parts necessary to fulfill each individual CTO order are pulled from inventory and each CTO order is built per the customer's specification (step 612), shipped to the customer (step 614) and the operation ends. If the operation determines that personalized parts in the current inventory cannot satisfy the demand (a "no" output to step 604), then the operation determines the part personalization requirements based on demand requirements and available inventory (step 606). In determining the part personalization requirements, the operation determines what generic parts and already personalized parts are available in the inventory that can be further personalized in order to satisfy the demand. The operation generates instructions for the personalization and re-personalization of the parts in inventory (step 608). The instructions are processed (step 610), causing the parts necessary to fulfill the demand to be built and placed in inventory. Parts are pulled from inventory as required by each individual CTO order and each order is built per the customer specifications (step 612), shipped to the customer (step 614) and the operations ends.

Thus, exemplary embodiments provide for dynamically managing a supply chain by dynamically analyzing shifting demand for personalized parts. Inventory carrying costs are thereby reduced, as is order fulfillment cycle time. The need for expedited inventory purchases also is reduced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method, in a computer system, for managing a supply chain by automatically analyzing shifting demand for personalized parts, the computer implemented method comprising:
    receiving a plurality of orders, wherein the plurality of orders form a demand and wherein the demand results in a set of parts that need to be personalized;
    analyzing the demand against current parts in existing inventory;
    determining the current parts necessary to fulfill the demand;
    automatically generating, by the computer system, instructions for personalizing the current parts to correspond with the demand;
    responsive to the current parts not including parts that have been personalized according to a particular personalization to fulfill one of said plurality of orders, automatically generating, by the computer system, instructions for re-personalizing parts that have already been personalized according to a different personalization;
    processing the instructions for personalizing the current parts and processing the instructions for re-personalizing parts that have already been personalized according to said different personalization; and
    in response to processing the instructions for re-personalizing parts that have already been personalized according to said different personalization, using the computer system to re-personalize parts, which have already been personalized according to the different personalization by transforming the parts that have already been personalized according to the different personalization, into parts that are personalized according to the particular personalization.

2. The computer implemented method of claim 1, further comprising:
    analyzing the demand against current parts in existing inventory according to a run rule.

3. The computer implemented method of claim 1, wherein the instructions for personalizing the current parts are based on run rules, and wherein the instructions for re-personalizating parts are based on the run rules.

4. The computer implemented method of claim 3, wherein the current parts comprise generic parts and personalized parts.

5. The computer implemented method of claim 3, wherein the run rules comprisepersonalization mapping and re-personalization mapping.

6. The computer implemented method of claim 5, wherein the run rules further comprise priority sorting.

7. The computer implemented method of claim 3, wherein the run rules compriseorder priority.

8. A computer program product comprising a computer usable medium storing computer usable program code for managing a supply chain by automatically analyzing shifting demand for personalized parts, the computer program product comprising:
    computer usable program code for receiving a plurality of orders, wherein the plurality of orders form a demand and wherein the demand results in a set of parts that need to be personalized;
    computer usable program code for analyzing the demand against current parts in existing inventory;
    computer usable program code for determining the current parts necessary to fulfill the demand;
    computer usable program code for automatically generating instructions for personalizing the current parts to correspond with the demand;
    computer usable program code responsive to the current parts not including parts that have been personalized according to a particular personalization to fulfill one of said plurality of orders, for automatically generating, by the computer system, instructions for re-personalizing parts that have already been personalized according to a different personalization;
    computer usable program code for processing the instructions for personalizing the current parts and processing the instructions for re-personalizing parts that have already been personalized according to said different personalization; and
    computer usable program code responsive to processing the instructions for re-personalizing parts that have already been personalized according to said different personalization, for re-personalizing parts that have already been personalized according to the different personalization by transforming the parts that have already been personalized according to the different personalization into parts that are personalized according to the particular personalization.

9. The computer program product of claim 8, further comprising:
    computer usable program code for analyzing the demand against current parts in existing inventory according to a run rule.

10. The computer program product of claim 8, wherein the instructions for personalizing the current parts are based on run rules, and wherein the instructions for re-personalizing parts are based on the run rules.

11. The computer program product of claim 10, wherein the current parts comprise generic parts and personalized parts.

12. The computer program product of claim 10, wherein the run rules comprise personalization mapping and re-personalization mapping.

13. The computer program product of claim 12, wherein the run rules further comprise priority sorting.

14. The computer program product of claim 10, wherein the run rules comprise order priority.

15. A data processing system for managing a supply chain by automatically analyzing shifting demand for personalized parts, the data processing system comprising:
    a storage device, wherein the storage device stores computer usable program code; and
    a processor, wherein the processor executes the computer usable program code to receive a plurality of orders, wherein the plurality of orders form a demand and wherein the demand results in a set of parts that need to be personalized; analyze the demand against current parts in existing inventory; determine the current parts necessary to fulfill the demand; automatically generate instructions for personalizing the current parts to correspond with the demand; responsive to the current parts not including parts that have been personalized according to a particular personalization to fulfill one of said plurality of orders, automatically generate instructions for re-personalizing parts that have already been personalized according to a different personalization; process the instructions for personalizing the current parts and process the instructions for re-personalizing parts that have already been personalized; and in response to processing the instructions for re-personalizing parts, re-personalize parts that have already been personalized according to the different personalization by transforming the parts that have already been personalized according to the different personalization into parts that are personalized according to the particular personalization.

16. The data processing system of claim 15, wherein the processor further executes the computer usable program code to analyze the demand against current parts in existing inventory according to a run rule.

17. The data processing system of claim 15, wherein the instructions for personalizing the current parts are based on run rules.

* * * * *